US010792922B2

United States Patent
Seki

(10) Patent No.: US 10,792,922 B2
(45) Date of Patent: Oct. 6, 2020

(54) INK JET HEAD AND INK JET PRINTER

(71) Applicant: TOSHIBA TEC KABUSHIKI KAISHA, Tokyo (JP)

(72) Inventor: Masashi Seki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/130,300

(22) Filed: Sep. 13, 2018

(65) Prior Publication Data

US 2019/0077153 A1     Mar. 14, 2019

(30) Foreign Application Priority Data

Sep. 14, 2017 (JP) .................. 2017-176587

(51) Int. Cl.
*B41J 2/16* (2006.01)
*B41J 2/14* (2006.01)
*C09D 171/00* (2006.01)

(52) U.S. Cl.
CPC ........... *B41J 2/1606* (2013.01); *B41J 2/1433* (2013.01); *B41J 2/162* (2013.01); *B41J 2/164* (2013.01); *B41J 2/1642* (2013.01); *C09D 171/00* (2013.01)

(58) Field of Classification Search
CPC ...... B41J 2/1606; B41J 2/1642; B41J 2/1433; B41J 2/164; B41J 2/162; B41J 2/045; B41J 2/04581; B41J 2/1609; B41J 2/1623; B41J 2/055; B41J 2/16538; B41J 2/14201; B41J 2002/16502; C09D 171/00
See application file for complete search history.

(56) References Cited

U.S. PATENT DOCUMENTS

| | | | |
|---|---|---|---|
| 9,302,481 B2 | 4/2016 | Tadachi et al. | |
| 9,724,925 B2 | 8/2017 | Nawano et al. | |
| 2005/0001879 A1* | 1/2005 | Miyajima | B41J 2/1606 347/45 |
| 2005/0088485 A1* | 4/2005 | Tamahashi | B41J 2/1606 347/45 |
| 2007/0242107 A1* | 10/2007 | Mori | B41J 2/14274 347/64 |
| 2012/0009889 A1 | 1/2012 | Morgan et al. | |
| 2017/0182770 A1* | 6/2017 | Gotou | B41J 2/1606 |
| 2017/0217178 A1 | 8/2017 | Seki | |

FOREIGN PATENT DOCUMENTS

| | | |
|---|---|---|
| CN | 2740401 Y | 11/2005 |
| CN | 102555326 A | 7/2012 |
| CN | 103895348 A | 7/2014 |
| CN | 106183421 A | 12/2016 |

(Continued)

OTHER PUBLICATIONS

U.S. Appl. No. 16/130,351, filed Sep. 13, 2018.

(Continued)

*Primary Examiner* — Manish S Shah
(74) *Attorney, Agent, or Firm* — Kim & Stewart LLP

(57) ABSTRACT

An ink jet head includes a nozzle plate substrate having a nozzle for ejecting ink toward a recording medium and an oil repellent film on a surface of the nozzle plate, the surface facing the recording medium. The oil repellent film comprises a terminal perfluoroalkyl group including a CF2 group, a CF3 group, and a CF3+δ group.

10 Claims, 7 Drawing Sheets

(56) References Cited

FOREIGN PATENT DOCUMENTS

| CN | 107020815 A | 8/2017 |
|---|---|---|
| JP | 2007106024 A | 4/2007 |

OTHER PUBLICATIONS

U.S. Appl. No. 16/130,366, filed Sep. 13, 2018.
U.S. Appl. No. 16/144,362, filed Sep. 27, 2018.
Chinese Office Action dated Apr. 24, 2020, mailed in counterpart Chinese Application No. 201810966880.6, 14 pages (with translation).

* cited by examiner

US 10,792,922 B2

INK JET HEAD AND INK JET PRINTER

CROSS-REFERENCE TO RELATED APPLICATION

This application is based upon and claims the benefit of priority from Japanese Patent Application No. 2017-176587, filed Sep. 14, 2017, the entire contents of which are incorporated herein by reference.

FIELD

Embodiments described herein relate generally to an ink jet head and an ink jet printer.

BACKGROUND

In an ink jet head, ink is pressurized by a piezoelectric element and ink droplets are ejected through nozzles in a nozzle plate. An ink (or oil) repellent film applied on a surface of the nozzle plate prevents the ink from adhering to the nozzle plate. In an existing ink jet head, an oil repellent film is formed of a fluorine compound on the surface of the nozzle plate substrate, for example, by an application method or a vapor epitaxy method. The fluorine compound based film has a surface energy that acts to repel oils.

DETAILED DESCRIPTION

In general, according to one embodiment, an ink jet head includes a nozzle plate substrate having a nozzle for ejecting ink toward a recording medium and an oil repellent film on a surface of the nozzle plate, the surface facing the recording medium. The oil repellent film comprises a terminal perfluoroalkyl group including a CF2 group, a CF3 group, and a $CF3+\delta$ group.

Hereinafter, an embodiment will be described with reference to drawings.

Figure 1:
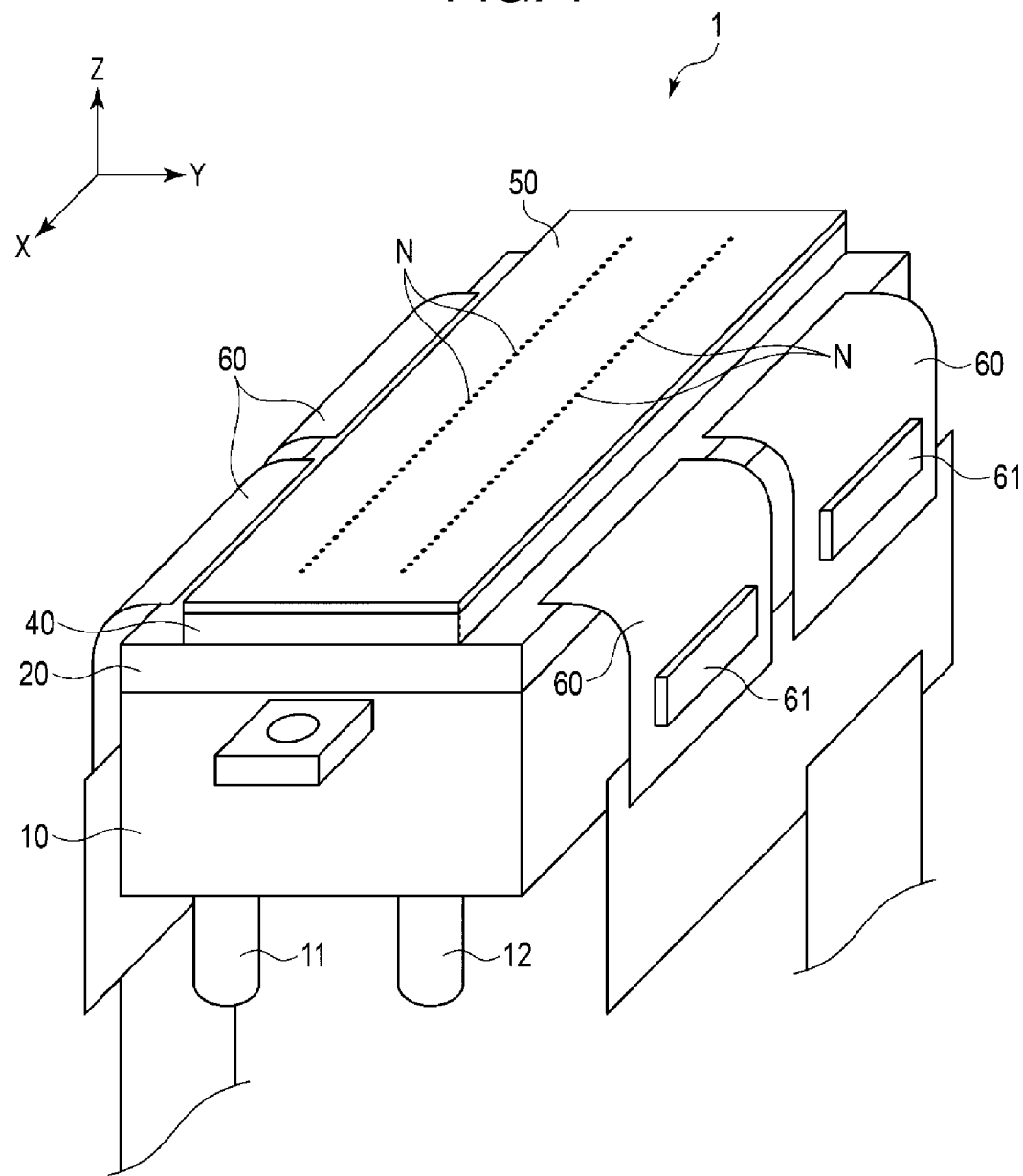
FIG. 1 is a perspective view of an ink jet head according to an embodiment.

FIG. 1 is a perspective view of an ink jet head 1 that is mounted on a head carriage of an ink jet printer. In the following description, an orthogonal coordinate system including an X axis, a Y axis, and a Z axis is used. The directions represented by the arrows in the drawing are assumed to be positive directions for convenience. The X axis direction is parallel to a width of recording medium. The Y axis direction is a direction in which the recording medium is transported. The Z axis direction is perpendicular to the recording medium.

The ink jet head 1 will be described with reference to FIG. 1. The ink jet head 1 includes an ink manifold 10, an actuator substrate 20, a frame 40, and a nozzle plate 50.

The actuator substrate 20 has a rectangular shape that is long in the X axis direction. Examples of a material of the actuator substrate 20 include alumina (Al2O3), silicon nitride (Si3N4), silicon carbide (SiC), aluminum nitride (AlN), and lead zirconate titanate (PZT: Pb(Zr, Ti)O$_3$).

The actuator substrate 20 is overlaid on the ink manifold 10 so as to block an opening end of the ink manifold 10. The ink manifold 10 is connected to an ink cartridge via an ink supply tube 11 and an ink returning tube 12.

The frame 40 is attached onto the actuator substrate 20. The nozzle plate 50 is attached onto the frame 40. Nozzles N are provided in the nozzle plate 50 at fixed intervals in the X axis direction so as to form two arrays along the Y axis.

Figure 2:
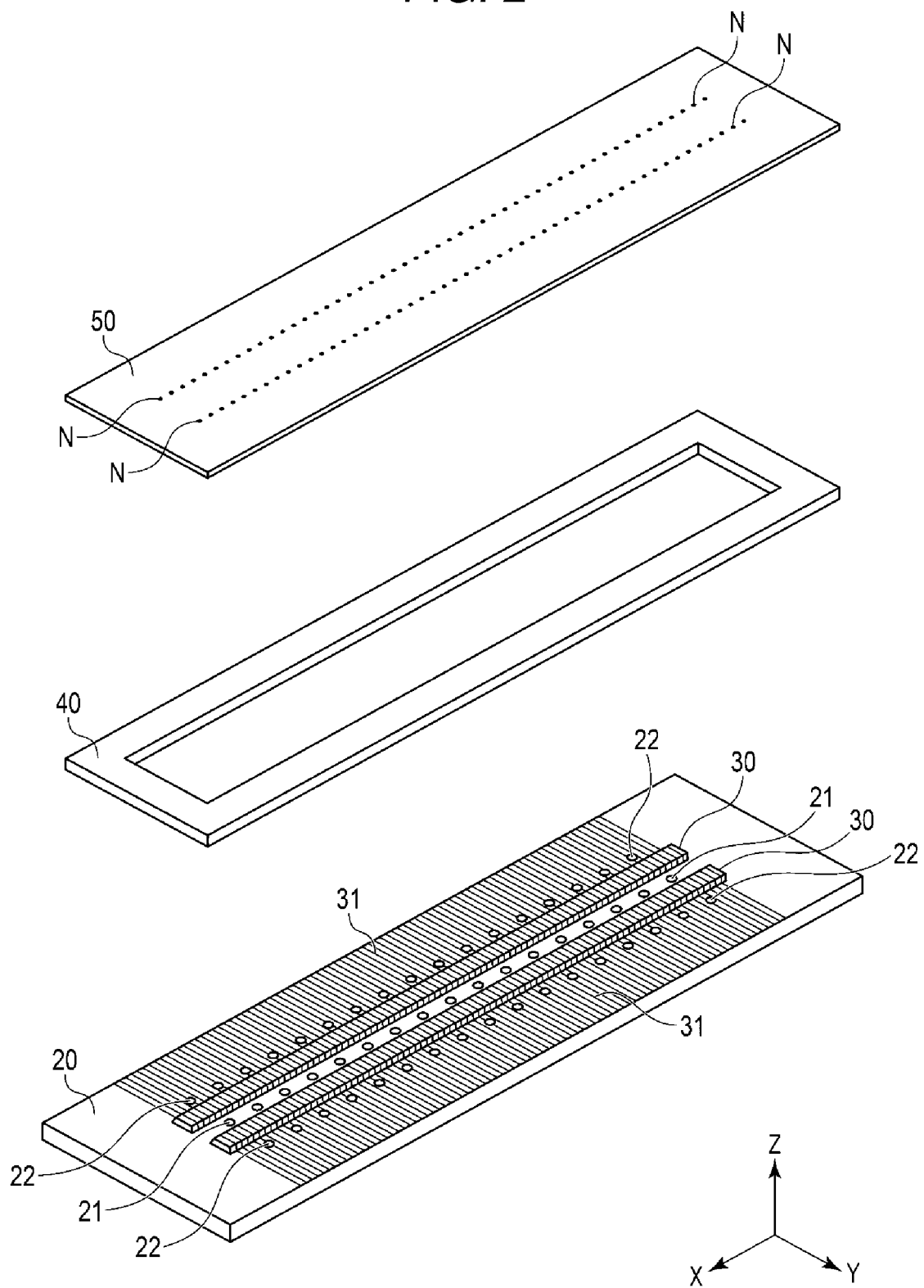
FIG. 2 is an exploded perspective view of an actuator substrate, a frame, and a nozzle plate of an ink jet head according to the embodiment.

FIG. 2 is an exploded perspective view of the actuator substrate 20, the frame 40, and the nozzle plate 50 of the ink jet head 1. In the example embodiment described herein, the ink jet head 1 is a side shooter type having shear mode shared walls.

Ink supply ports 21 are provided in the actuator substrate 20 at intervals along the X axis direction so as to form an array at the center in the Y axis direction. Ink discharge ports 22 are provided in the actuator substrate 20 at intervals in the X axis direction so as to form the arrays on either positive and negative directions in the Y axis direction relative to the array of the ink supply ports 21.

Actuators 30 are provided between the array of the ink supply ports 21 at the center and one of the arrays of the ink discharge ports 22. These actuators 30 form an array extending in the X axis direction. The actuators 30 are also provided between the array of the ink supply ports 21 at the center and the other array of the ink discharge ports 22. These actuators 30 also form an array extending in the X axis direction.

Each array of actuators 30 includes a first piezoelectric body and a second piezoelectric body laminated on the actuator substrate 20. Examples of materials of the first and second piezoelectric bodies include lead zirconate titanate (PZT), lithium niobite (LiNbO$_3$), and lithium tantalite (LiTaO$_3$). The first and second piezoelectric bodies are polarized in mutually opposite directions in the thickness direction.

Grooves each extend in the Y axis direction and are arrayed along the X axis direction in the body laminated on the actuator substrate 20. These grooves are opened on the side of the second piezoelectric body and have a depth that is greater than the thickness of the second piezoelectric body. Hereinafter, portions between adjacent grooves in the laminated body will be referred to as "channel walls." The channel walls each extend in the Y axis direction and are spaced from each other in the X axis direction. A groove between two adjacent channel walls serves as an ink channel through which ink is distributed.

Electrodes are formed at side walls and the bottom of the ink channel. The electrodes are connected to a wiring pattern 31 that extends in the Y axis direction.

A protection film (not particularly depicted) is formed on the surface of the actuator substrate 20 to cover the electrodes and the wiring pattern 31 except for a connection part for connecting to a flexible print substrate 60. The protection film may be made of inorganic insulating films and organic insulating films.

The frame 40 has an opening that is smaller than the actuator substrate 20 and is larger than an area of the actuator substrate 20 on which the ink supply ports 21, the actuator 30, and the ink discharge ports 22 are provided. The frame 40 may be made of ceramic. The frame 40 is bonded to the actuator substrate 20 with an adhesive, for example.

The nozzle plate 50 includes a nozzle plate substrate 51 and an oil repellent film 52 on a medium facing surface, from which the ink is ejected via the nozzles N. The nozzle plate substrate 51 may be made of a resin film such as a polyimide film. The nozzle plate 50 is larger than the opening in the frame 40. The nozzle plate 50 is bonded to the frame 40 with an adhesive, for example.

Nozzles N are provided in the nozzle plate 50. The nozzles N form two arrays so as to correspond to the ink channels. The nozzles N each have a diameter that increases in the ink channel direction from the recording medium facing surface. The diameter of each nozzle N is set to a predetermined value in accordance with the desired amount of ink to be ejected. The nozzles N can be formed by using excimer laser.

The actuator substrate 20, the frame 40, and the nozzle plate 50 are integrated as illustrated in FIG. 1 and form a hollow structure. A region surrounded by the actuator substrate 20, the frame 40, and the nozzle plate 50 serves as an ink distribution chamber. The ink is cycled such that the ink is supplied to the ink distribution chamber from the ink manifold 10 through the ink supply ports 21 and passes through the ink channels, and excessive ink returns from the ink discharge ports 22 to the ink manifold 10. Some of the ink is ejected from the nozzles N as it is flowing through the ink channels and is used for printing.

A flexible print substrate 60 is connected to the wiring pattern 31 at a position on the actuator substrate 20 and outside the frame 40. A drive circuit 61 for driving the actuator 30 is mounted on the flexible print substrate 60.

Hereinafter, operations of the actuator 30 will be described. Here, the ink channel in the middle of three adjacent ink channels is focused upon, and operations thereof will be described. The ink channel in the middle may be referred to as a middle ink channel and the ink channels on either side of the middle ink channel may be referred to as side ink channels. Electrodes corresponding to the three adjacent ink channels are referred to as electrodes A, B, and C (electrodes A and C correspond to the side ink channels and electrode B corresponds to the middle ink channel). When an electric field is not being applied in the direction orthogonal to channel walls, the channel walls are in an erect state.

For example, a voltage pulse with a potential that is higher than potentials of the electrodes A and C is applied to the electrode B to cause an electric field in the direction orthogonal to the channel walls. In this manner, the channel walls are driven in a shear mode, and the channel walls of the middle ink channel are deformed such that the volume of the middle ink channel expands.

A voltage pulse with a potential that is higher than the potential of the electrode B is applied to the electrodes A and C to cause an electric field in the direction orthogonal to the channel walls. In this manner, the channel walls are driven in the shear mode, and the channel walls of the middle ink channel are deformed such that the volume of the middle ink channel contracts. Due to the expansion and the contraction, a variable pressure is applied to the ink in the middle ink channel, and the ink is ejected from the nozzles N corresponding to the middle ink channel onto the recording medium in conjunction with pressure increases.

In some embodiments, the nozzles are divided into three groups such that the driving operation is performed in three cycles under time division control, and printing on the recording medium is thus performed.

Figure 3:
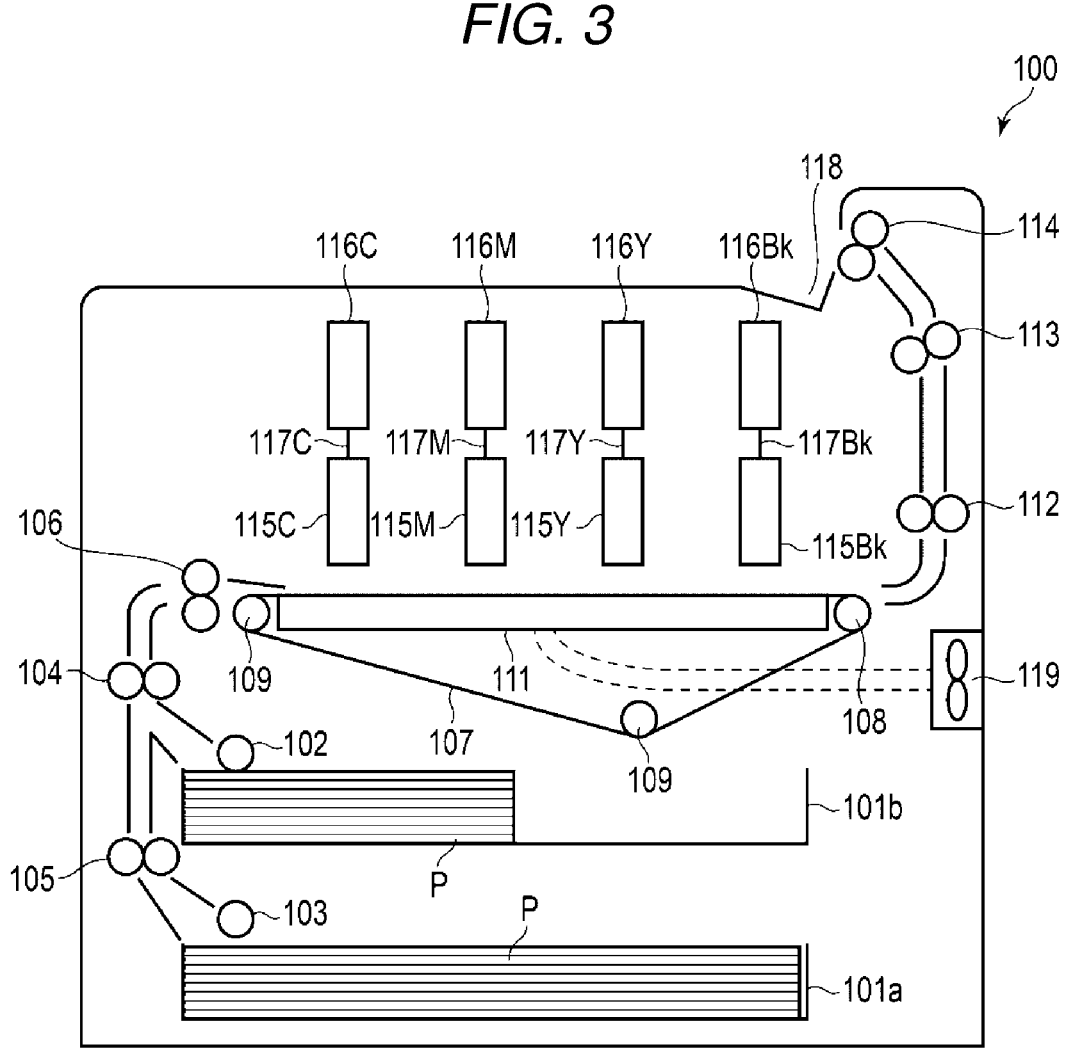
FIG. 3 is a schematic diagram of an ink jet printer according to the embodiment.

FIG. 3 is a schematic diagram of an ink jet printer 100. The ink jet printer 100 depicted in FIG. 3 includes a case body with a sheet discharge tray 118. In the case body, cassettes 101a and 101b, sheet supply rollers 102 and 103, transport roller pairs 104 and 105, a registration roller pair 106, a transport belt 107, a fan 119, a negative pressure chamber 111, transport roller pairs 112, 113, and 114, ink jet heads 115C, 115M, 115Y and 115Bk, ink cartridges 116C, 116M, 116Y and 116Bk, and tubes 117C, 117M, 117Y, and 117Bk are installed.

The cassettes 101a and 101b accommodate recording media P with different sizes. The sheet supply roller 102 or 103 takes the recording medium P corresponding to a selected recording medium size from the cassette 101a or 101b and transports the recording medium P to the transport roller pairs 104 and 105 and the registration roller pair 106.

Tensile force is applied to the transport belt 107 by a drive roller 108 and two driven rollers 109. Holes are provided at fixed intervals on the surface of the transport belt 107. The negative pressure chamber 111 coupled to the fan 119 for adsorbing the recording medium P to the transport belt 107 is installed inside the transport belt 107. The transport roller pairs 112, 113, and 114 are installed on the downstream side of the transport belt 107 in the transport direction. In some embodiments, a heater is installed for heating a printed layer formed on the recording medium P on a transport path from the transport belt 107 to the sheet discharge tray 118.

In FIG. 3, four ink jet heads that eject the ink onto the recording medium P in accordance with image data are arranged above the transport belt 107. Specifically, the ink jet head 115C that ejects cyan (C) ink, the ink jet head 115M that ejects magenta (M) ink, the ink jet head 115Y that ejects yellow (Y) ink, and the ink jet head 115Bk that ejects black (Bk) ink are arranged in this order from the upstream side. Each of the ink jet heads 115C, 115M, 115Y, and 115Bk is the ink jet head 1 described with reference to FIGS. 1 and 2.

The cyan (C) ink cartridge 116C, the magenta (M) ink cartridge 116M, the yellow (Y) ink cartridge 116Y, and the black (Bk) ink cartridge 116Bk that respectively accommodate corresponding ink are installed above the ink jet heads 115C, 115M, 115Y, and 115Bk. The ink cartridges 116C, 116M, 116Y, and 116Bk are coupled to the ink jet heads 115C, 115M, 115Y, and 115Bk by the tubes 117C, 117M, 117Y, and 117Bk, respectively.

Next, image forming operations of the ink jet printer 100 will be described.

First, an image processing unit (not specifically depicted) of the ink jet printer 100 starts image processing for recording, generates image signals corresponding to image data, and generates control signals for controlling operations of various rollers, the negative pressure chamber 111, and the like.

The sheet supply roller 102 or 103 selects the recording medium P one by one from the cassette 101a or 101b controlled by the image processing unit and transports the recording medium P to the transport roller pairs 104 and 105 and the registration roller pair 106. The registration roller pair 106 corrects skew of the recording medium P and transports the recording medium P at a predetermined timing.

The negative pressure chamber 111 suctions air via the holes in the transport belt 107. Therefore, the recording medium P can be transported one sheet after another to a position below the ink jet heads 115C, 115M, 115Y, and 115Bk as the transport belt 107 moves while the recording medium P is attached to the transport belt 107.

The ink jet heads 115C, 115M, 115Y, and 115Bk eject the ink in synchronization with a timing at which the recording medium P is transported controlled by the image processing unit. In this manner, a color image is formed at a desired position on the recording medium P.

The transport roller pairs 112, 113, and 114 discharge the recording medium P on which the image has been formed to the sheet discharge tray 118. If the heater is installed in the transport path from the transport belt 107 to the sheet discharge tray 118, the print layer formed on the recording medium P may be heated by the heater. In particular, if the recording medium P is impermeable, the heating of the print layer enhances adherence of the printing layer to the recording medium P.

Figure 4:
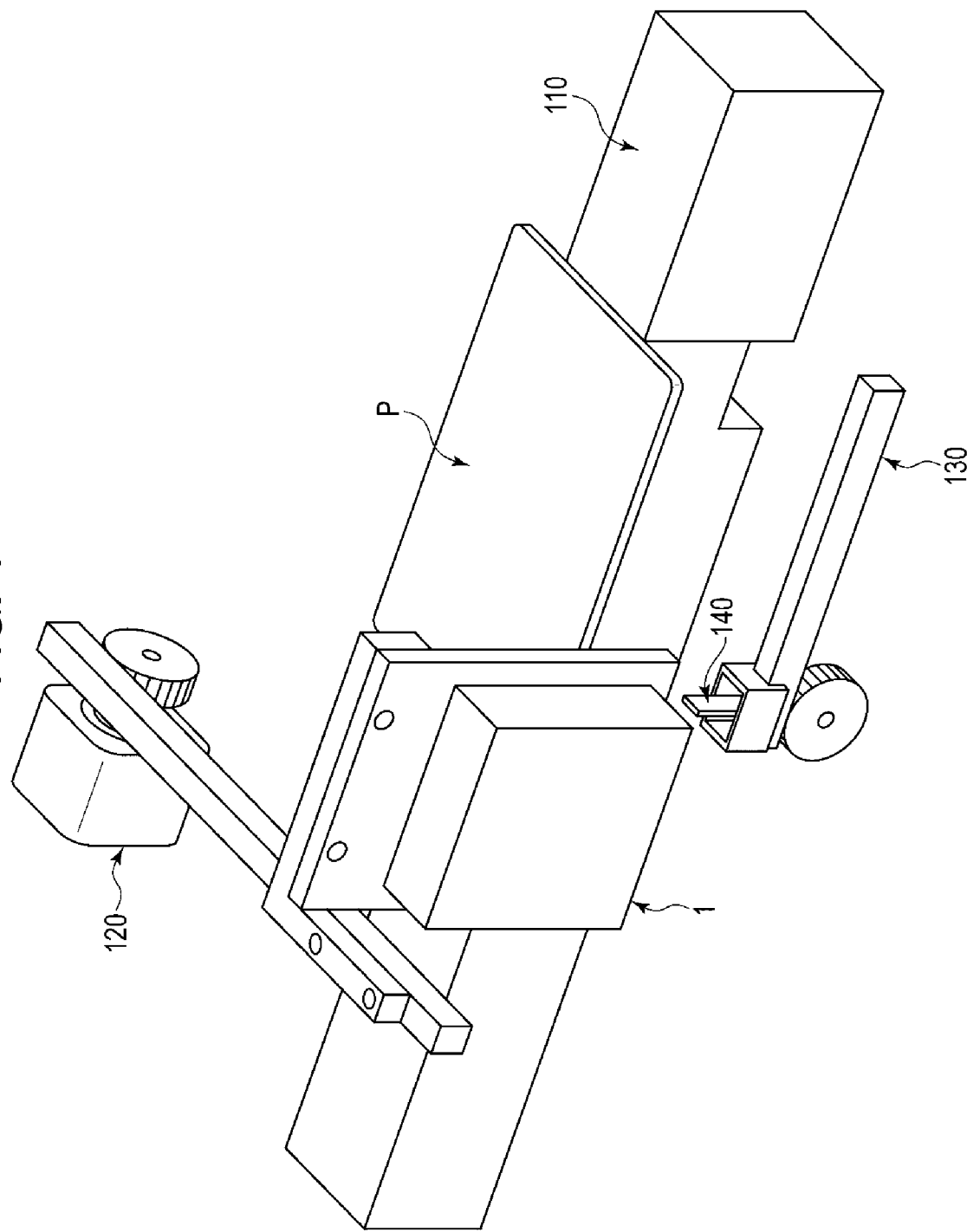
FIG. 4 is an exploded perspective view of an ink jet printer according to the embodiment.

FIG. 4 is an exploded perspective view of the ink jet printer 100. FIG. 4 illustrates the ink jet head 1 described above, a medium holding mechanism 110, a head moving mechanism 120, a blade moving mechanism 130, and a wiping blade 140.

The medium holding mechanism 110 holds the recording medium P such as a recording sheet so as to face the ink jet head 1. The medium holding mechanism 110 also has functions as a recording sheet transferring mechanism that transfers the recording medium. The medium holding mechanism 110 includes the transport belt 107, the drive roller 108, the driven roller 109, the negative pressure chamber 111, and the fan 119 (depicted in FIG. 3). The medium holding mechanism 110 transfers the recording medium P in a direction parallel to the print surface of the recording medium P while the recording medium P faces the ink jet head 1. During this transfer, the ink jet head 1 ejects ink droplets from the nozzles and performs printing on the recording medium P.

The head moving mechanism 120 moves the ink jet head 1 to a printing position during printing. The head moving mechanism 120 moves the ink jet head 1 to a cleaning position during cleaning.

The wiping blade 140 faces the recording medium P and rubs the surface of the nozzle plate 50 and clears off the ink from the surface of the nozzle plate 50.

The blade moving mechanism 130 moves the wiping blade 140. Specifically, the blade moving mechanism 130 causes the wiping blade 140 to abut on the recording medium facing surface of the nozzle plate 50 and moves the wiping blade 140 on the surface after the head moving mechanism 120 moves the ink jet head 1 to the cleaning position. In this manner, the wiping blade 140 removes the ink adhering to the recording medium facing surface of the nozzle plate 50.

In some embodiments, the wiping blade 140 and the blade moving mechanism 130 may be omitted.

In the ink jet head 1, an oil repellent film is formed on the medium facing surface of the nozzle plate 50. The oil repellent film may be formed of a fluorine compound.

Figure 5:
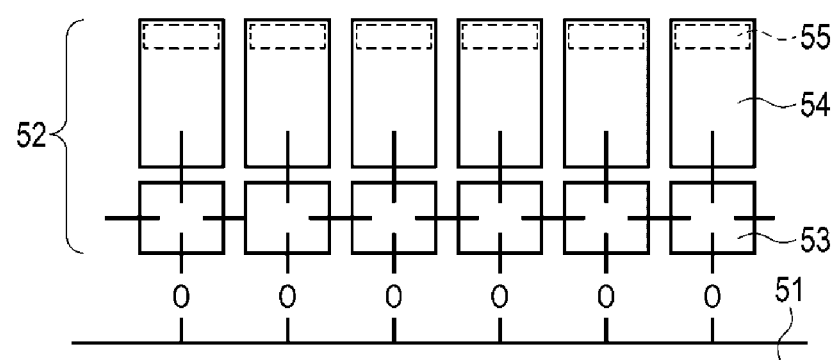
FIG. 5 is a schematic diagram of an oil repellent film in an ink jet head according to the embodiment.

FIG. 5 is a schematic diagram of an oil repellent film on the medium facing surface of the nozzle plate substrate 51.

Figure 7:
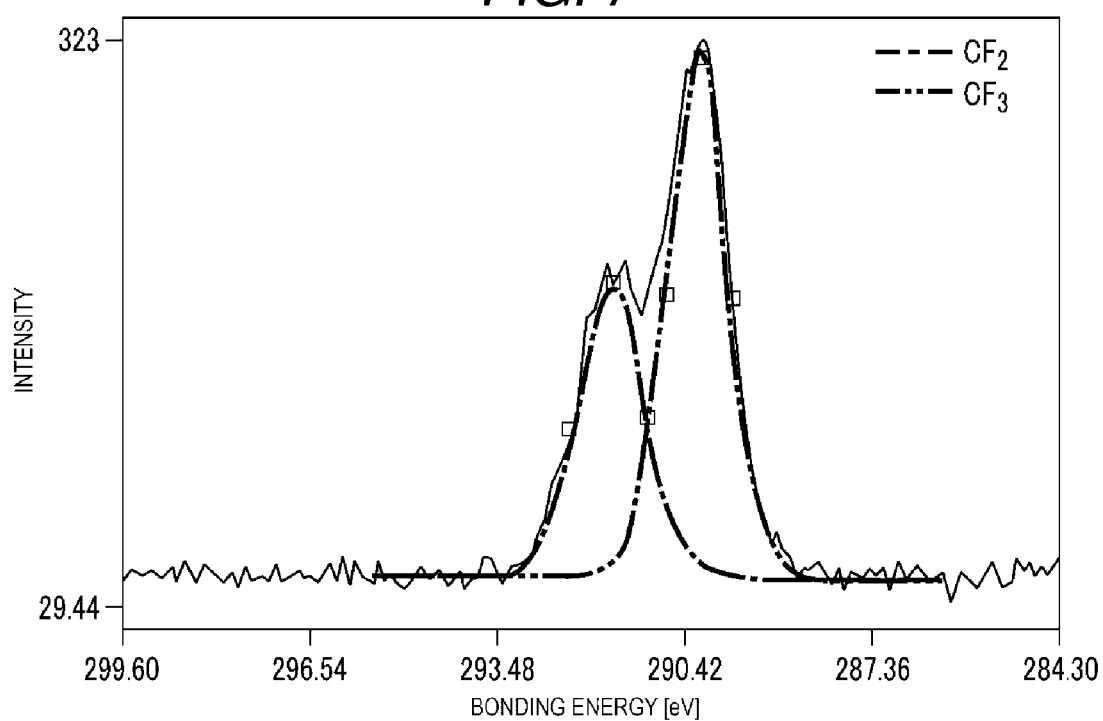
FIG. 7 depicts results of analysis by a XPS method of an oil repellent film on a nozzle plate substrate in Example 2.
Figure 8:
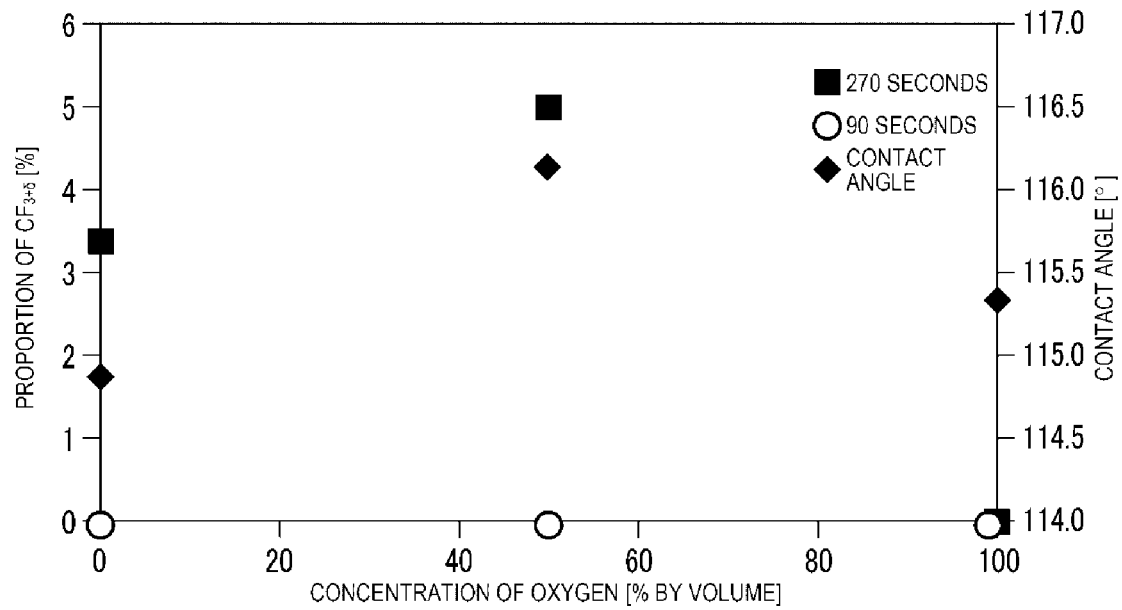
FIG. 8 depicts proportions of peak areas attributable to $CF3+\delta$ groups in oil repellent films in Examples 1 to 6 with respect to the entire peak areas, and measurement results of water contact angles.

When the oil repellent film 52 is subjected to X-ray photoelectron spectroscopy (XPS) analysis, a peak in intensity for difluoromethylene (CF2) groups, a peak for trifluoromethyl (CF3) groups, and a peak for CF3+δ groups are detected as depicted in FIGS. 7 and 8. The peaks appear at bonding energies of the CF2 group, the CF3 group, and the CF3+δ group, respectively. The CF3+δ group has a higher bonding energy than the CF3 group.

When a substance is irradiated with an X ray having energy about several keV, bonded electrons in an atomic orbital absorb energy of the X ray and are then released as photoelectrons. The following relationship is met between bonding energy Eb of the bonded electrons and kinetic energy Ek of the photoelectrons.

$$Eb = h\nu - Ek - \phi sp$$

Here, $h\nu$ represents the energy of the X ray, and $\phi sp$ represents a work function of a spectroscope.

Therefore, it is possible to obtain the bonding energy Eb of the bonded electrons based on the kinetic energy Ek of the photoelectrons if the energy $h\nu$ of the X ray is known (that is, a wavelength of the X ray is known). Since the bonding energy Eb of the bound electrons is unique to each element, constituent elements of the substance can be analyzed. Since a shift in the bonding energy measured by the spectroscope corresponds to a change in a chemical bonding state and a valence electron state (such as an oxidation number) of the constituent elements, it is possible to analyze the chemical bonding state of the constituent elements.

Figure 6:
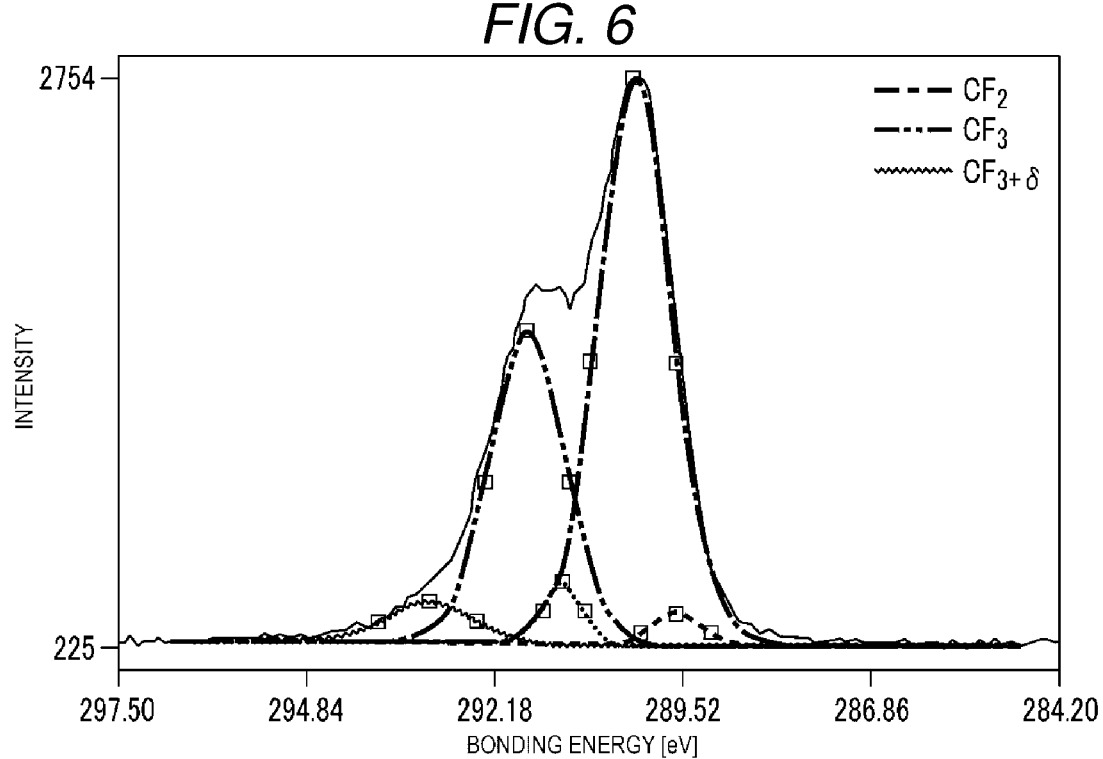
FIG. 6 depicts results of analysis by a XPS method of an oil repellent film on a nozzle plate substrate in Example 1.

As depicted in FIG. 6, the peak for the "CF3+δ group" is at a bonding energy that is larger than that of the CF3 group due to overlapping of the CF3 groups with adjacent terminal perfluoroalkyl groups. That is, the fluorine compound is bonded to the nozzle plate substrate 51, where the CF3 group is present with high density, in particular, in the vicinity of the surface of the oil repellent film 52.

Therefore, the oil repellent film 52 can repel ink even under small surface tensile force, for example, surface tensile force of equal to or less than 25 mN/m.

The ratio of the peak area of the CF3+δ group to the total peak area is preferably within a range of 1 to 10% and is more preferably within a range from 5 to 10% for repelling ink. The "total peak area" refers to a total value of peak areas detected when analysis by the XPS method is performed.

In the example embodiments described herein, the fluorine compound is bonded to the nozzle plate substrate 51 and has a terminal perfluoroalkyl group 55. For example, the fluorine compound is a linear molecule that has a substrate bonding site at one end and has a perfluoroalkyl group at the other end.

The bonding site 53 is a portion of the compound which may form a chemical bond to the nozzle plate substrate, for example, by a reaction with a functional group on the surface of the nozzle plate substrate 51. The bonding site 53 may itself include a reactive functional group. In this case, the bonding site 53 is bonded to the nozzle plate substrate 51 by the reactive functional group reacting with the functional group on the surface of the nozzle plate substrate 51. Examples of the reactive functional group include an unsaturated hydrocarbon group such as an epoxy group, an amino group, a methacryl group, or a vinyl group or a mercapto group. Examples of the functional group on the surface of the nozzle plate substrate 51 include a hydroxyl group, an ester bonding group, an amino group, or a thiol group. Alternatively, the bonding site may be an alkoxysilane group. In this case, the bonding site is bonded to the nozzle plate substrate 51 by a silanol group generated by hydrolysis of the alkoxysilane group reacting with the functional group, such as a hydroxyl group, that is present on the surface of the nozzle plate substrate 51.

The bonding sites 53 of the fluorine compound are also bonded to bonding sites of adjacent fluorine compounds on the nozzle plate substrate 51. In some embodiments, each bonding site further contains one or more silicon atoms between the reactive functional group and the terminal perfluoroalkyl group 55, and in the adjacent fluorine compounds on the nozzle plate substrate 51, the bonding sites are bonded to each other with siloxane bonding (Si—O—Si).

The terminal perfluoroalkyl group 55 is a linear perfluoroalkyl group. The number of carbon atoms in the terminal perfluoroalkyl group 55 can be selected from within a range from 3 to 7 (referred to as C3 to C7). The terminal perfluoroalkyl group 55 preferably erects in the normal direction of the nozzle plate substrate 51.

The fluorine compound may further include a spacer linking group that is between the site (bonding site 53) which bonds to the nozzle plate substrate 51 and the terminal perfluoroalkyl group 55. Presence of such a spacer linking group can be advantageous for providing a film in which the terminal perfluoroalkyl groups 55 are erect in a direction normal to the surface of the nozzle plate substrate 51. Examples of the spacer linking group include a perfluoropolyether group.

Examples of a fluorine compound include compounds represented by Formula (1) or (2) represented below.

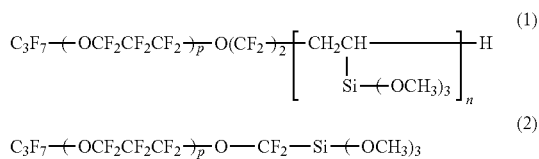

In Formula (1), p is a value from 1 to 50, and n is a value from 1 to 10. While each molecule of the fluorine compound has only integer values for p (1 to 50), each molecule of the fluorine compound in a film does not necessarily need to have the same p value and, when referring to the composition of a film, collectively, the value of p need not be an integer value and may represent an averaged value of all fluorine compound molecules in the film (or a measured region of the film) that is a natural number.

In Formula (2), p is also a value of 1 to 50 in the same manner as was described as within the context of Formula (1).

The coating structure illustrated in FIG. 5 is obtained as follows, for example. In the example embodiment described herein, it is assumed that a hydroxyl group will initially be present on an exposed surface of the nozzle plate substrate 51 and that the fluorine compound contains an alkoxysilane group at the bonding site.

However, if the nozzle plate substrate 51 is made of a resin film such as a polyimide film as described above then the nozzle plate substrate 51 might not sufficiently provide the surface hydroxyl groups necessary for bonding to the fluorine compound for film formation. Therefore, it may be preferable to perform a pre-processing on the nozzle plate substrate 51 prior to the formation of the oil repellent film 52.

In some embodiments, the pre-processing is an ion plasma processing on the surface of the nozzle plate substrate 51 in argon-oxygen mixture gas. The ion plasma processing can be performed as follows: the nozzle plate substrate 51 is placed in a vacuum chamber, the air in the chamber is removed, the atmosphere surrounding the nozzle plate substrate 51 is replaced with an argon-oxygen mixture, and a plasma is then generated in the chamber.

The surface of the nozzle plate substrate 51 is modified by performing ion plasma processing in the atmosphere containing oxygen to provide additional hydroxyl group sites. This ion plasma processing, when performed in the atmosphere containing argon in addition to oxygen, further acts to remove contaminants adhered to the surface of the nozzle plate substrate 51 and not necessarily easily removable by reaction(s) with oxygen plasma.

The ion plasma processing is preferably performed in the argon-oxygen mixture gas in which the concentration of oxygen is equal to or less than 50% by volume and is more preferably performed in the argon-oxygen mixture gas in which the concentration of oxygen is within a range of 20 to 50% by volume. Note that when the concentration of oxygen is excessively high, there is a concern that the surface of the nozzle plate substrate 51 will be damaged, and increased surface roughness occurs. If increased surface roughness occurs on the surface of the nozzle plate substrate 51, there is a concern that bonding of the oil repellent film 52 becomes insufficient to cover the entirety of the roughen surface.

The ion plasma processing is preferably performed for 100 seconds or more and is more preferably performed for 200 seconds or more. If the plasma exposure time is too short, there is a concern that surface modification is not sufficiently performed on the nozzle plate substrate.

Next, the fluorine compound is supplied to the surface of the nozzle plate substrate 51 by a vapor deposition method such as a vacuum deposition method. Alternatively, the fluorine compound may be applied directly to the surface of the nozzle plate substrate 51 in a wet processing step.

Then, hydrolysis of the alkoxysilane group in the fluorine compound supplied to the surface of the nozzle plate substrate 51 occurs.

Once hydrolysis of the alkoxysilane group has occurred, a silanol group is generated. The silanol group and the hydroxyl group present on the medium facing surface of the nozzle plate substrate 51 react via a dehydration condensation. In this manner, the nozzle plate substrate 51 and the fluorine compound are bonded to each other via a siloxy group (—Si—O—) of silicon atoms in the bonding site 53. Silicon atoms at the bonding site 53 of the fluorine compound are also bonded to bonding sites of adjacent fluorine compounds by siloxane bonding (—Si—O—Si—).

In this example, the terminal perfluoroalkyl group 55 is bonded to the silicon atoms at the bonding site 53 via a perfluoropolyether group (a spacer linking group 54). The spacer linking group 54 permits the terminal perfluoroalkyl groups 55 be erect in a direction normal to the surface of the nozzle plate substrate 51. In this arrangement, terminal perfluoroalkyl groups 55 provide ink repellency. If the number of carbons is 3 (C3), the terminal perfluoroalkyl group 55 can be represented as CF3—CF2—CF2— and ink repellency of a CF3 group is higher than that of a CF2 group.

In the structure illustrated in FIG. 5, the terminal perfluoroalkyl group 55 stands up (is erect) in the normal direction from the nozzle plate substrate 51. Also, the fluorine compound is bonded at a high density (coverage ratio) on the nozzle plate surface 51 on which the ion plasma processing has been performed in the argon-oxygen mixture gas. Therefore, if analysis is performed by an XPS method, the peak attributable to the CF3+δ group is detected in addition to the peak of the CF2 group and the peak of the CF3 group.

With such a structure, the terminal perfluoroalkyl group 55 merely swings in the lateral direction and will not be removed from the surface of the oil repellent film 52 even when a cleaning by the wiping blade 140 is repeated. Therefore, the ink repellency is not substantially degraded with repeated cleaning.

If the terminal perfluoroalkyl group 55 has a structure as illustrated in FIG. 5, the CF3 group is present on the uppermost surface of the oil repellent film 52, and the CF2 group is below the uppermost surface.

When this oil repellent film 52 is analyzed by the XPS, the peak of the CF2 group and the peak of the CF3 group are both detected. In the example embodiment described herein, the ratio of the peak area of the CF3 group to the peak area of the CF2 group ranges from about 0.1 to 0.6. If the number of carbon atoms in the terminal perfluoroalkyl group 55 is 3, the ratio of the peak area of the CF3 group is about 0.6. The ratio of the peak area of the CF3 group approaches 0.1 as the number of carbon atoms in the terminal perfluoroalkyl group 55 approaches 7. If the ratio of the peak area of the CF3 group is within the range from 0.1 to 0.6 relative to the peak area of the CF2 group, degradation of the ink repellency that might accompany the cleaning of the recording medium facing surface of the nozzle plate by the wiping blade particularly decreases in a noticeable manner.

Hereinafter, test results on examples of oil repellent films formed on nozzle plates by various methods will be described.

EXAMPLE 1

A nozzle plate in this Example 1 was produced by the following method.

First, the ion plasma processing was performed on a recording medium facing surface of a nozzle plate substrate made of a polyimide film. Specifically, the nozzle plate substrate was installed in a chamber, the chamber was vacuumed, and the atmosphere in the chamber was then replaced with argon-oxygen mixture gas in which the concentration of oxygen is 50% by volume. Thereafter, energy was set to 900 eV to cause plasma, and this state was maintained for 270 seconds. A hydroxyl group was generated on the recording medium facing surface of the nozzle plate substrate by performing a preprocessing process as described above.

Next, an evaporation source containing a fluorine compound represented by the following formula was prepared.

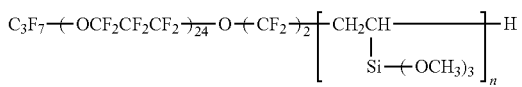

The evaporation source and the nozzle plate substrate were placed in a vacuum deposition apparatus, and the fluorine compound was deposited on the recording medium surface of the nozzle plate substrate by the vacuum deposition method. An oil repellent film was thus formed on the recording medium facing surface of the nozzle plate substrate as described above.

EXAMPLE 2

A nozzle plate was produced by a method that is similar to that in Example 1 other than that the energy at the time of ion plasma processing was changed to 300 eV and the irradiation time was changed to 90 seconds.

Evaluation—Analysis of Surface of Oil Repellent Film

The nozzle plates obtained in Examples 1 and 2 were analyzed by the XPS method. Note that an AXIS-ULTRA DLD (Shimadzu Corporation, KRATOS) was used for measurements performed here and analysis by the XPS method was as described below.

FIG. 6 depicts results of the analysis by the XPS method of the oil repellent film on the nozzle plate substrate in Example 1. FIG. 7 depicts results of the analysis by the XPS method of the oil repellent film on the nozzle plate substrate in Example 2. In FIGS. 6 and 7, the vertical axis represents intensity of detected peaks, and the horizontal axis represents bonding energy.

As illustrated in FIG. 7, the nozzle plate obtained in Example 2 had peaks attributable to the CF3 group and the CF2 group. Note that a peak attributable to CF3+δ was not substantially observed in the nozzle plate obtained in Example 2.

As illustrated in FIG. 6, the nozzle plate obtained in Example 1 has the CF3+δ group that indicates higher bonding energy than that of the CF3 group in addition to the peaks attributable to the CF3 group and the CF2 group. Here, the CF3+δ group is defined as a group that is detected as a result of adjacent terminal perfluoroalkyl group overlapping each other and has higher bonding energy than that of the CF3 groups alone (non-overlapped CF3 groups).

The peak areas of the respective peaks were calculated from the XPS analysis results of the nozzle plates obtained in Examples 1 and 2. Results are illustrated in Table 1.

TABLE 1

|  | CF2 | CF3 | CF3 + δ |
|---|---|---|---|
| Example 1 | 58% | 32% | 5% |
| Example 2 | 63% | 37% | — |

As illustrated in Table 1, the proportion of the peak area of the peak attributable to the CF3+δ group was 5% with respect to the entire peak area for the nozzle plate obtained in Example 1.

EXAMPLE 3

A nozzle plate was produced by a method that is similar to that in Example 1 other than that the atmosphere at the time of the ion plasma processing was changed to argon alone (that is, the concentration of oxygen was 0% by volume).

The nozzle plate obtained in Example 3 was analyzed by the XPS method. The peak areas of the respective peaks were calculated from the XPS analysis result. In Example 3, the proportion of the peak area attributable to the CF3+δ group was 3.4%.

EXAMPLE 4

A nozzle plate was produced by a method that was similar to that in Example 3 other than that the processing time of the ion plasma processing was changed from 270 seconds to 90 seconds.

EXAMPLE 5

A nozzle plate was produced by a method that was similar to that in Example 1 other than that the atmosphere at the time of the ion plasma processing was changed to oxygen alone (that is, the concentration of oxygen was 100% by volume).

EXAMPLE 6

A nozzle plate was produced by a method that was similar to that in Example 5 other than that the processing time at the ion plasma processing was changed from 270 seconds to 90 seconds.

The nozzle plates obtained in Examples 4 and 6 were analyzed by the XPS method, and the peak areas attributable to the CF3+δ group were calculated. In Examples 4 and 6, the proportions of the peak areas attributable to the CF3+δ group were 0%.

It was surprisingly discovered from the results that the ion plasma processing was preferably performed for 100 seconds or more and was more preferably performed for 200 seconds or more to cause an increase in CF3+δ group appearance.

Evaluation

FIG. 8 depicts relationships between the concentration of oxygen in the atmosphere during the ion plasma processing and proportions of the peak areas attributable to the CF3+δ group on the surface of the oil repellent films with respect to the entire peak areas for the nozzle plates in Examples 1 to 6. In FIG. 8, the first vertical axis represents the proportions of the peak areas attributable to the CF3+δ groups with respect to the entire peak areas, the second vertical axis represents contact angles, and the horizontal axis represents oxygen content in the atmosphere.

When an oil repellent film was formed on a nozzle plate substrate after ion plasma processing was performed on the nozzle plate substrate for 270 seconds under a condition of concentration of the oxygen content of 0 or 50% by volume in the atmosphere as illustrated in FIG. 8, a peak attributable to the CF3+δ group was observed.

When an oil repellent film was formed on a nozzle plate substrate after ion plasma processing was performed on the nozzle plate substrate for 270 seconds under a condition of concentration of oxygen of 100% by volume in the atmosphere, a peak attributable to the CF3+δ group was not observed.

In Examples 1, 3, and 5, the proportion of the peak area attributable to the CF3+δ group in Example 1 was 5%, the proportion of the peak area in Example 3 was 3.4%, and the proportion of the peak area in Example 5 was 0%. That is, the proportion of the peak area attributable to the CF3+δ group increased as the concentration of oxygen increased when oxygen was contained at a proportion of 50% by volume or less in the atmosphere.

The reason that the peaks attributable to the CF3+δ group were observed in the nozzle plates obtained in Examples 1 and 3 is, without requiring or limiting the present disclosure to any specific molecular mechanism of formation, considered as follows. The hydroxyl group that is generated in the recording medium facing surface of the nozzle plate substrate increases by performing the ion plasma processing in the atmosphere with the concentration of oxygen of 50% by volume or less. The increase in the hydroxyl group leads to an increase in the amount of fluorine compound that is covalently bonded to the hydroxyl group by dehydration condensation. Therefore, the fluorine compound can be bonded to the nozzle plate substrate at high density. If the nozzle plate to which the fluorine compound is bonded with high density is analyzed by the XPS method, adjacent terminal perfluoroalkyl groups are detected in an overlapping manner. Therefore, a peak attributable to a group with higher bonding energy than that of the CF3 group, that is the CF3+δ group is observed.

The following is considered as a reason that the peak attributable to the CF3+δ group was not observed in the nozzle plate in Example 5 may be as follows, without requiring or limiting the present disclosure to any specific molecular mechanism of formation. If the concentration of oxygen in the atmosphere is excessively high, the recording medium facing surface of the nozzle plate substrate tends to be damaged by the ion plasma processing. The hydroxyl group tends not to be generated in high density for such a damaged recording medium facing surface. It is considered that as a result, the density of the bonding of the fluorine compound to the nozzle plate substrate decreases, and the peak attributable to the CF3+δ group is not observed.

Contact Angle

FIG. 8 depicts measurement results of water contact angles for the nozzle plates obtained in Examples 1, 3, and 5. Here, stationary contact angles of pure water were measured in accordance with a static drop method described in JIS R3257-1999 "Substrate glass surface wettability test method". However, the measurement was conducted by using the aforementioned nozzle plates here instead of a glass substrate.

As illustrated in FIG. 8, the contact angle of the nozzle plate obtained in Example 1, in which the peak area attributable to the CF3+δ group was the maximum, with respect to water was also maximum from among the nozzle plates obtained in Examples 1, 3, and 5. That is, the nozzle plate to which the fluorine compound was bonded at high density exhibited excellent water repellency.

As for the nozzle plates obtained in Examples 1 and 2 and the following Example 7 relationships between the number of times the nozzle plates were rubbed with the wiping blade and the speeds at which the nozzle plates repelled the ink were examined.

EXAMPLE 7

As a material of the oil repellent film, CYTOP® (A type) manufactured by Asahi Glass Co., Ltd., which is represented by the following formula, was prepared. This oil repellent film material is a fluorine compound and has a terminal group that contains alkoxysilane groups at both terminals of a polymer main chain represented by the following formula. End groups are not specifically depicted in the formula below.

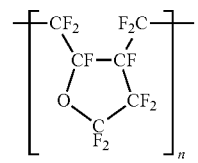

CYTOP® was applied to the surface of the nozzle plate substrate, the alkoxysilane end group at both terminal ends of the CYTOP molecules were caused to react with a hydroxyl group on the surface of the nozzle plate substrate, and CYTOP® was thus bonded to the surface of the nozzle plate substrate.

The nozzle plates obtained according to Examples 1, 2, and 7 were rubbed with a wiping blade a predetermined number of times under a load of 13 gf (gram force), and a speed at which the nozzle plates repelled the ink was measured.

The speeds at which the nozzle plates repelled the ink were measured as follows. Sample nozzle plates (having oil repellent films with the width of 15 mm thereon) were prepared. The nozzle plates were held at one end and substantially immersed in ink while in a substantially erect state (e.g., perpendicular to an upper surface of the ink), the nozzle plates were then pulled out from the ink by nozzle plate length of 45 mm, and time required for the ink to disappear from the now exposed parts (45 mm of the plate) after the pulling out was measured.

The length of the oil repellent films immersed with the ink is represented by L (here, L=45 mm), the time required for the ink to disappear from the exposed part is represented by T (seconds), and the speed Rr (as mm/second) at which ink flows off the oil repellent film is defined as follows.

$$R_r \text{ (in mm/second)} = L/T = 45 \text{ mm}/T$$

The nozzle plates with the oil repellent films applied thereto were rubbed with a wiping blade multiple times under a load of 13 gf. Thereafter, the speeds $R_r$ at which the oil repellent films repelled the ink were measured again by a method similar to that described above.

Figure 9:
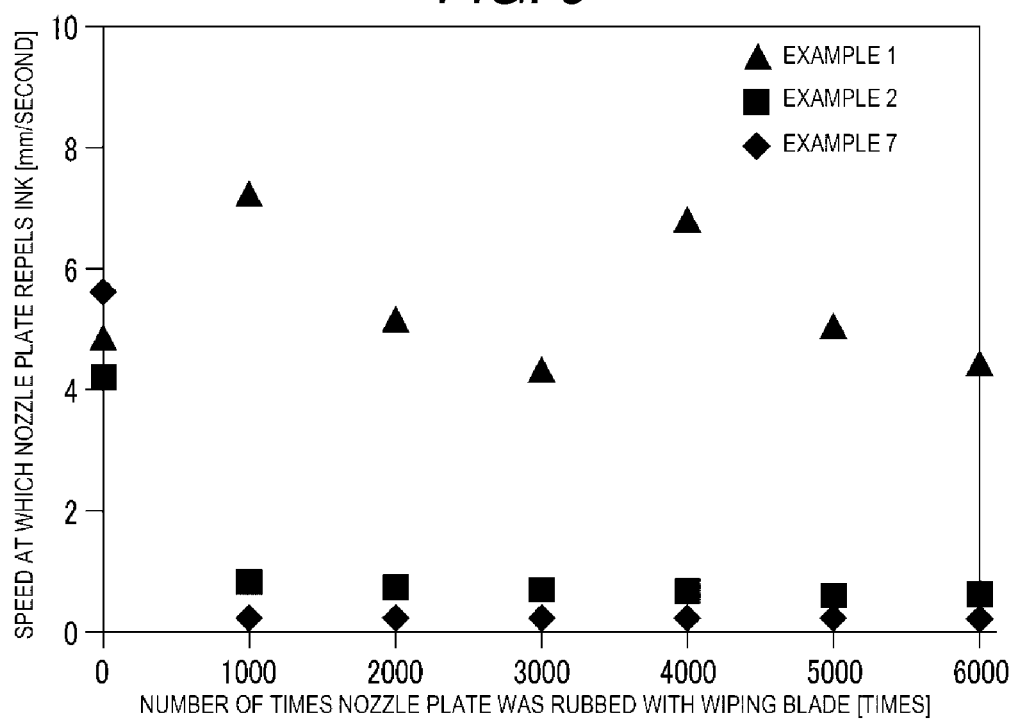
FIG. 9 depicts relationships between the number of times nozzle plates in Examples 1, 2, and 7 are rubbed with a wiping blade and speeds at which the nozzle plates repel ink.

FIG. 9 depicts relationships between the number of times the nozzle plates were rubbed with the wiping blade and the measured speeds at which the nozzle plates repelled the ink for the nozzle plates obtained in Examples 1, 2, and 7. In FIG. 9, the horizontal axis represents the number of times the nozzle plates were rubbed with the wiping blade, and the vertical axis represents the speeds at which the nozzle plates repelled the ink.

The following can be observed in FIG. 9. For the nozzle plates obtained in Examples 2 and 7, the ink repellency was significantly degraded in a stage between zero and 1000 wipings with the blade. In contrast, degradation of the ink repellency was suppressed in the nozzle plates obtained according to Example 1 and substantially repellency was maintained even up to 6000 wipings.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ink jet head, comprising:
   a nozzle plate substrate having a nozzle for ejecting ink toward a recording medium; and
   an oil repellent film on a surface of the nozzle plate substrate, the surface facing the recording medium, wherein
   the oil repellent film comprises a fluorine compound having a first end, a second end, and a spacer linking group, the first end bonded to the surface of the nozzle plate substrate, a terminal perfluoroalkyl group at the second end, and a spacer linking group linking the first and second ends, and
   an XPS analysis of the oil repellent film shows peaks for at least a CF2 group, a CF3 group, and a CF3+δ group.

2. The ink jet head according to claim 1, wherein the terminal perfluoroalkyl group is C3F7, and the spacer linking group is —(OCF2CF2CF2)$_{24}$—O—(CF2)$_2$—.

3. The ink jet head according to claim 1, wherein the terminal perfluoroalkyl group is C3F7, and the spacer linking group is —(OCF2CF2CF2)$_p$—O—(CF2)$_2$—, p being a value from 1 to 50.

4. The ink jet head according to claim 1, wherein the nozzle plate substrate comprises a polyimide film.

5. The ink jet head according to claim 1, wherein in the oil repellent film, a ratio of a density of the CF3 group with respect to a density of the CF2 group is between 0.1 and 0.6.

6. The ink jet head according to claim 1, wherein the nozzle plate substrate comprises a resin film.

7. An ink jet printer, comprising:
   a nozzle plate substrate having a nozzle for ejecting ink toward a recording medium;
   an oil repellent film on a surface of the nozzle plate substrate, the surface facing the recording medium; and
   a medium holding mechanism that faces the nozzle plate substrate and holds the recording medium, wherein
   the oil repellent film comprises a fluorine compound having a first end, a second end, and a spacer linking group, the first end bonded to the surface of the nozzle plate substrate, a terminal perfluoroalkyl group at the second end, and a spacer linking group linking the first and second ends,
   an XPS analysis of the oil repellent film shows peaks for at least a CF2 group, a CF3 group, and a CF3+δ group.

8. The ink jet printer according to claim 7, wherein the nozzle plate substrate comprises a polyimide film.

9. The ink jet printer according to claim 7, wherein in the oil repellent film, a ratio of a density of the CF3 group with respect to a density of the CF2 group is between 0.1 and 0.6.

10. The ink jet printer according to claim 7, wherein the nozzle plate substrate comprises a resin film.

* * * * *